(12) United States Patent
Nakamura et al.

(10) Patent No.: US 8,315,037 B2
(45) Date of Patent: Nov. 20, 2012

(54) DIELECTRIC CERAMIC AND LAMINATED CERAMIC CAPACITOR

(75) Inventors: Masanori Nakamura, Moriyama (JP); Shinichi Yamaguchi, Ritto (JP); Toshikazu Takeda, Omihachiman (JP)

(73) Assignee: Murata Manufacturing Co., Ltd., Nagaokayo-Shi, Kyoto-fu (JP)

( * ) Notice: Subject to any disclaimer, the term of this patent is extended or adjusted under 35 U.S.C. 154(b) by 382 days.

(21) Appl. No.: 12/690,331

(22) Filed: Jan. 20, 2010

(65) Prior Publication Data

US 2010/0195265 A1 Aug. 5, 2010

(30) Foreign Application Priority Data

Jan. 30, 2009 (JP) ................................. 2009-019020

(51) Int. Cl.
*H01G 4/06* (2006.01)
*C04B 35/00* (2006.01)
(52) U.S. Cl. ................... 361/321.4; 361/321.5; 501/138
(58) Field of Classification Search .... 361/321.1–321.5, 361/311; 501/137–139
See application file for complete search history.

(56) References Cited

U.S. PATENT DOCUMENTS

| 6,292,354 | B1 * | 9/2001 | Kobayashi et al. | ........ 361/321.2 |
| 6,514,603 | B2 * | 2/2003 | Chazono | ....................... 428/213 |

FOREIGN PATENT DOCUMENTS

| JP | 2001-015374 A | 1/2001 |
| JP | 2001-291634 A | 10/2001 |
| JP | 2003-063863 A | 3/2003 |
| JP | 2004-247719 A | 9/2004 |
| JP | 2007-001840 A | 1/2007 |

* cited by examiner

*Primary Examiner* — Eric Thomas
(74) *Attorney, Agent, or Firm* — Dickstein Shapiro LLP

(57) ABSTRACT

A dielectric ceramic which improves the lifetime characteristics and dielectric breakdown voltage of a laminated ceramic capacitor includes core-shell crystalline grains which have a core-shell structure and homogeneous crystalline grains which have a homogeneous structure. In this dielectric ceramic, the core-shell crystalline grains and the homogeneous crystalline grains are present at an area ratio in the range of 91:9 to 99:1. Preferably, when the mean grain size for the core-shell crystalline grains is represented by R1 and the mean grain size for the homogeneous crystalline grains is represented by R2, the ratio of R2/R1 is 0.8 or more and 3 or less.

20 Claims, 1 Drawing Sheet

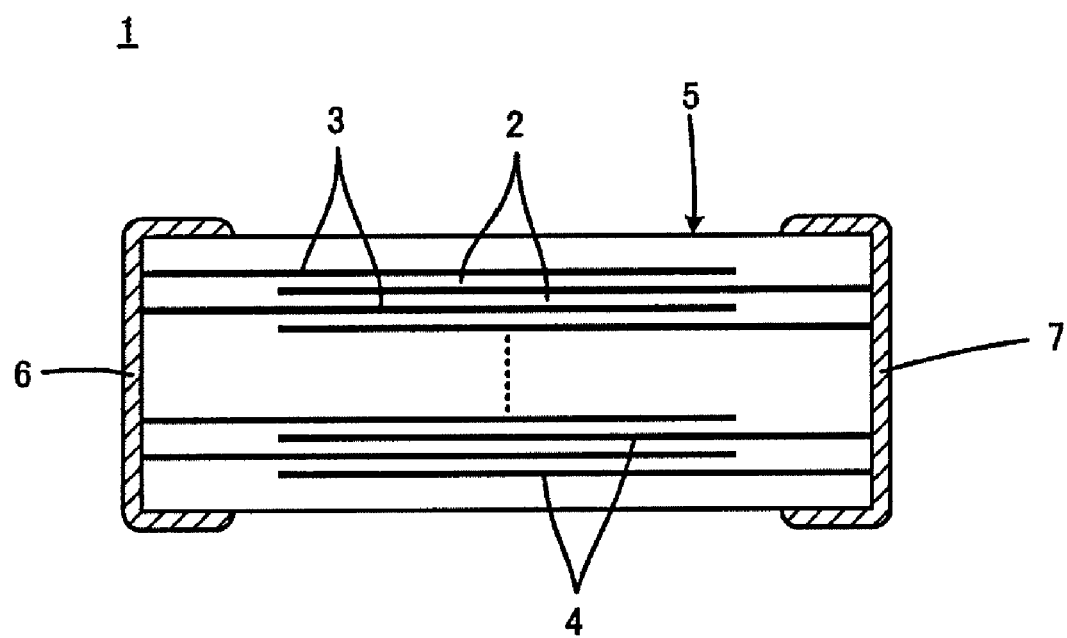

DIELECTRIC CERAMIC AND LAMINATED CERAMIC CAPACITOR

BACKGROUND OF THE INVENTION

1. Field of the Invention

The invention relates to a dielectric ceramic, and a laminated ceramic capacitor configured with the use of the dielectric ceramic, and more particularly, relates to an improvement for making the withstand voltage of a dielectric ceramic higher.

2. Description of the Related Art

As one of effective means for satisfying the demands of reduction in size and increase in capacitance for laminated ceramic capacitors, an attempt to make dielectric ceramic layers included in laminated ceramic capacitors thinner may be made.

However, making the dielectric ceramic layers thinner also makes it easier to cause dielectric breakdown in laminated ceramic capacitors when a large direct current or the like is applied. Given these circumstances, it is important that the voltage at dielectric breakdown (BDV=break down voltage) is high, and therefore, dielectric ceramics with high BDVs have been required.

Core-shell materials are suitable for applications in which relatively large voltages are applied. Dielectric ceramics including both crystalline grains which have a core-shell structure and crystalline grains which have a homogeneous structure have been used when in addition to a high BDV, good electronic characteristics (dielectric constant, the temperature characteristics of capacitance, the lifetime characteristics in a high temperature load test, etc.) are desired.

For example, Japanese Patent No. 3376963 (Patent Document 1) and Japanese Patent No. 3793697 (Patent Document 2) disclose dielectric ceramics including both crystalline grains which have a core-shell structure and crystalline grains which have a homogeneous structure, and laminated ceramic capacitors using the dielectric ceramics.

The dielectric ceramic used in the laminated ceramic capacitor disclosed in Patent Document 1 has a mixture of grains which have a core-shell structure and grains which have a homogeneous structure, and when any cross section of the ceramic sintered body is observed, the grains which have the core-shell structure and the grains which have the homogeneous structure are present at an area ratio in the range of 2:8 to 4:6. According to this dielectric ceramic, it seems that the relative dielectric constant is increased to 4500 or more, and a laminated ceramic capacitor using this dielectric ceramic satisfies D characteristics as temperature characteristics of capacitance in accordance with the JIS standard (Japanese industrial standard).

On the other hand, the dielectric ceramic of the laminated ceramic capacitor disclosed in Patent Document 2 has a shell thickness which changes as the grain which has the core-shell structure becomes closer to a conductive layer, and grains which have no core-shell structure, that is, which have the homogeneous structure, are present at the interface between the layer and the conductor, and the ratio between the grains which have the core-shell structure and the number of the grains which have no core-shell structure is 7:3 or more and 9:1 or less. It seems that the employment of such a configuration improves the withstand voltage characteristics.

However, the dielectric ceramics disclosed in each of Patent Documents 1 and 2 described above still have problems to be solved.

More specifically, the dielectric ceramic described in Patent Document 1 can be further improved with respect to the temperature characteristics of capacitance, as it fails to satisfy the X5R characteristics in accordance with the EIA standard. Furthermore, the increase in the ratio of the crystalline grains which have the homogeneous structure easily results in grain growth, in particular, when the layer is made further thinner, and the lifetime characteristics may be decreased.

While it seems that the dielectric ceramic described in Patent Document 2 improves the withstand voltage characteristics, that withstand voltage characteristics is still unsatisfactory when the layer is made further thinner. Furthermore, the desired lifetime characteristics is also difficult to achieve.

SUMMARY OF THE INVENTION

Therefore, an object of the invention is to provide a dielectric ceramic, and a laminated ceramic capacitor configured with the use of the dielectric ceramic, which can solve the problems described above.

This invention has a feature in that a dielectric ceramic includes core-shell crystalline grains which have a core-shell structure and homogeneous crystalline grains which have a homogeneous structure, and wherein the core-shell crystalline grains and the homogeneous crystalline grains are present at an area ratio in the range of 91:9 to 99:1.

When the mean grain size for the core-shell crystalline grains is represented by R1, and the mean grain size for the homogeneous crystalline grains is represented by R2 in the dielectric ceramic according to the present invention, it is preferable that the ratio of R2/R1 is 0.8 or more and 3 or less.

The dielectric ceramic according to the present invention typically has a composition containing $ABO_3$ being Ba, and may further be at least one of Ca and Sr; B is Ti, and may further be at least one of Zr and Hf) as a main component, and R (R is at least one selected from La, Ce, Pr, Nd, Sm, Eu, Gd, Tb, Dy, Ho, Er, Tm, Yb, and Lu) or Mg as an accessory component.

The present invention is further directed to a laminated ceramic capacitor including: a capacitor main body composed of a plurality of laminated dielectric ceramic layers, and a plurality of internal electrodes at interfaces between the dielectric ceramic layers; and a plurality of external electrodes formed in positions different from each other on the outer surface of the capacitor main body, and electrically connected to specific ones of the internal electrodes.

The laminated ceramic capacitor according to the invention has a feature in that a dielectric ceramic layer is composed of the dielectric ceramic according to the invention as described above.

According to the dielectric ceramic according to the invention, the core-shell crystalline grains and the homogeneous crystalline grains are present at an area ratio in the range of 91:9 to 99:1. Therefore, the lifetime characteristics and BDV can be more improved. Furthermore, the relatively small amount of homogeneous crystalline grains can thus make the temperature characteristics more favorable.

In the dielectric ceramic according to the invention, when the ratio R2/R1 of the mean grain size R2 for the homogeneous crystalline grains to the mean grain size R1 for the core-shell crystalline grains is 0.8 or more and 3 or less, the lifetime characteristics and BDV can be further improved.

Accordingly, the laminated ceramic capacitor configured with the use of the dielectric ceramic according to the invention can make the dielectric ceramic layers thinner while maintaining high reliability, thereby allowing the laminated ceramic capacitor to be reduced in size and increased in capacitance, as well as allowing the lifetime characteristics and temperature characteristics to be made better.

BRIEF DESCRIPTION OF THE DRAWINGS

FIG. 1 is a cross-sectional view schematically illustrating a laminated ceramic capacitor 1 configured with the use of a dielectric ceramic according to the invention.

DETAILED DESCRIPTION OF THE INVENTION

First, a laminated ceramic capacitor 1 to which a dielectric ceramic according to the invention is applied will be described with reference to FIG. 1.

The laminated ceramic capacitor 1 includes a capacitor main body 5 composed of a plurality of laminated dielectric ceramic layers 2 and a plurality of internal electrodes 3 and 4 along different interfaces between the dielectric ceramic layers 2. The internal electrodes 3 and 4 contain, for example, a base metal such as Ni, as its main component.

First and second external electrodes 6 and 7 are formed in positions different from each other on the outer surface of the capacitor main body 5. The external electrodes 6 and 7 can contain Ag, Cu, or Ag—Pd as their main components. In the laminated ceramic capacitor 1 shown in FIG. 1, the first and second external electrodes 6 and 7 are formed on each of end faces of the capacitor main body 5 opposed to each other. The internal electrodes 3 and 4 include a plurality of first internal electrodes 3 electrically connected to the first external electrode 6 and a plurality of second internal electrodes 4 electrically connected to the second external electrode 7, and these first and second internal electrodes 3 and 4 are interlaminated in the laminate direction.

In this laminated ceramic capacitor 1, the dielectric ceramic constituting the dielectric ceramic layers 2 has a feature in that the dielectric ceramic includes core-shell crystalline grains which have a core-shell structure and homogeneous crystalline grains which have a homogeneous structure, and the core-shell crystalline grains and the homogeneous crystalline grains are present at an area ratio in the range of 91:9 to 99:1.

It is to be noted that the "core-shell structure" mentioned above refers to a state in which an accessory component is present as a solid solution in a surface layer portion of the crystalline grain, whereas a region in which no accessory component is present as a solid solution is present in the center portion thereof. Furthermore, the "homogeneous structure" refers to a state in which the accessory component is present homogeneously as a solid solution in the entire crystalline grain.

With the dielectric ceramic described above, the lifetime characteristics and BDV of the laminated ceramic capacitor 1 can be more improved, as is clear from experimental examples described below. Furthermore, the relatively small amount of homogeneous crystalline grains can thus make the temperature characteristics more favorable.

In order to further improve the lifetime characteristics and BDV mentioned above, when the mean particle size for the core-shell crystalline grains is represented by R1 and the mean grain size for the homogeneous crystalline grains is represented by R2, it is preferable that the ratio of R2/R1 be 0.8 or more and 3 or less.

The dielectric ceramic described above typically has a composition containing $ABO_3$ (A being Ba, and may further contain at least one of Ca and Sr; B being Ti, and may further contain at least one of Zr and Hf) as the main component, and R (R is at least one selected from La, Ce, Pr, Nd, Sm, Eu, Gd, Tb, Dy, Ho, Er, Tm, Yb, and Lu) or Mg as the accessory component.

Experimental examples carried out based on the invention will be described below.

EXPERIMENTAL EXAMPLE 1

(A) Manufacture of Dielectric Ceramic Raw Material

For manufacturing a dielectric ceramic raw material, respective powders of $BaTiO_3$, $Dy_2O_3$, $MnCO_3$, $MgCO_3$, $SiO_2$, $BaCO_3$, and $(Ba_{0.96}Dy_{0.04})(Ti_{0.97}Mg_{0.03})O_3$ were prepared. It is to be noted that the $BaTiO_3$ powder was prepared with the mean grain size of 195 nm through SEM observation and the $(Ba_{0.94}Dy_{0.06})(Ti_{0.97}Mg_{0.03})O_3$ powder was prepared with the mean grain size of 333 nm through SEM observation.

Next, $Dy_2O_3$, $MnCO_3$, $MgCO_3$ and $SiO_2$ were weighed to reach 2 moles, 1 mole, 2 moles, and 1 mole, respectively, with respect to 100 moles of $BaTiO_3$. Furthermore, $(Ba_{0.94}Dy_{0.06})(Ti_{0.97}Mg_{0.03})O_3$ was weighed have the ratio shown in the column "$(Ba_{0.94}Dy_{0.06})(Ti_{0.97}Mg_{0.03})O_3$ Powder/Mix Ratio" of Table 1, with respect to the $BaTiO_3$. Furthermore, $BaCO_3$ was weighed to reach Ba/Ti=1.015.

Next, after mixing the respective powders of $BaTiO_3$, $Dy_2O_3$, $MnCO_3$, $MgCO_3$, $SiO_2$, $BaCO_3$, and $(Ba_{0.96}Dy_{0.04})(Ti_{0.97}Mg_{0.03})O_3$ weighed as described above, pure water (water injection ratio: 1.2) was added, and grinding was then carried out in a forced circulation type wet grinding mill (with the use of PSZ media 0.3 mm in diameter).

Next, the ground powders was put into an oven set at a temperature of 140° C. and dried for 8 hours to obtain a dielectric ceramic raw powder.

(B) Manufacture of Laminated Ceramic Capacitor

Next, a polyvinyl butyral binder and an organic solvent such as ethanol were added to the dielectric ceramic raw material powder for wet mixing in a ball mill, thereby preparing ceramic slurry.

The ceramic slurry was subjected to sheet forming by the doctor blade method to obtain rectangular ceramic green sheets.

Next, a conductive paste containing Ni was screen-printed on ceramic green sheets described above to form a conductive paste film to serve as internal electrodes.

Next, 100 ceramic green sheets with the conductive paste films formed thereon were laminated so that the opposed sides from which the conductive paste films are drawn are alternated, thereby obtaining a green laminated body to serve as a capacitor main body.

Next, the green laminated body was heated to a temperature of 250° C. in a $N_2$ atmosphere, and subjected to processing for removing the binder, and then a calcination step was carried out under the conditions of maintaining a top temperature of 1230° C. and a partial oxygen pressure of $10^{-9.5}$ Pa for 120 minutes in a reducing atmosphere composed of a $H_2$-$N_2$-$H_2O$ gas to sinter the raw laminated body, thereby obtaining a capacitor main body.

Next, an Ag—Pd paste containing glass frit was applied to the opposed edge surfaces of the obtained laminated body, and baked at a temperature of 800° C. in a $N_2$ atmosphere to form external electrodes electrically connected to the internal electrodes, thereby obtaining laminated ceramic capacitors as samples.

The laminated ceramic capacitor thus obtained had outer dimensions of a width 1.6 mm, a length 3.2 mm, and a thickness 0.8 mm, and the thickness of the dielectric ceramic layer interposed the internal electrodes was 2.5 μm.

(C) Analysis of Ceramic Structure

For the laminated ceramic capacitors according to the respective samples obtained, mapping analysis for Dy and Mg was carried out by TEM-EDX at polished ceramic cross section. In this analysis, the region to be analyzed was prepared to include at least 100 crystalline grains, the beam spot diameter was made 1 nm, and the number of acquisitions was set to be 30 at 0.5 msec/point.

In the results of the analysis described above, the crystalline grains in which Dy or Mg is homogeneously present are referred to as "homogeneous grains", whereas the crystalline grains in which a region in which none of Dy and Mg is present is located in the center portion are referred to as "core-shell crystalline grains". The areas of the respective grains were calculated by image analysis to obtain the area ratio.

This area ratio is shown in the column "Sintered Body Area Ratio/Core-Shell:Homogeneous" of Table 1.

Furthermore, the mean grain size R1 for the "core-shell crystalline grains" and the mean grain size R2 for the "homogeneous crystalline grains" were obtained by similar image processing. These mean grain sizes "R1" and "R2" and "R2/R1" are shown in Table 1.

(D) Evaluation of Electrical Characteristics

For the laminated ceramic capacitors according to the respective samples obtained, the dielectric constant, temperature characteristics, accelerated life, and BDV were evaluated as shown in Table 1.

The dielectric constant was calculated from the capacitance measured at 0.5 Vrms and 1 kHz.

For the temperature characteristics, the rate of change in capacitance in the range of −55° C. to 125° C. was obtained with the capacitance at 25° C. The maximum rate of change is shown in Table 1.

For the accelerated life, a high temperature load test of applying a voltage of 100 V (electric field strength: 40 kV/mm) at a temperature of 150° C. was carried out for the 20 samples, and breakdown defined as when the insulation resistance value was less than 10 kΩ. The 50% frequency down time obtained from the Weibull distribution is shown in Table 1.

For the BDV, the voltage was gradually increased, and the voltage at the point of dielectric breakdown (10 kΩ or less) was obtained.

(E) Results

TABLE 1

| Sample Number | $(Ba_{0.94}Dy_{0.06})(Ti_{0.97}Mg_{0.03})O_3$ Powder Mix Ratio (weight ratio) | Sintered Body Area Ratio Core-Shell: Homogeneous | R1 (nm) | R1 (nm) | R2/R1 | Dielectric Constant | Temperature Characteristics (%) | Accelerated Life (hours) | BDV (V) |
|---|---|---|---|---|---|---|---|---|---|
| 1 | 100:0 | 100:0 | 189 | — | 0 | 1821 | −13.7 | 349 | 480 |
| 2 | 99:1 | 99:1 | 210 | 320 | 1.5 | 1830 | −13.7 | 457 | 564 |
| 3 | 97:3 | 97:3 | 200 | 351 | 1.8 | 1810 | −14.0 | 553 | 581 |
| 4 | 95:5 | 95:5 | 198 | 284 | 1.4 | 1795 | −14.3 | 652 | 584 |
| 5 | 93:7 | 93:7 | 215 | 332 | 1.5 | 1801 | −14.7 | 639 | 600 |
| 6 | 91:9 | 91:9 | 209 | 301 | 1.4 | 1790 | −14.9 | 534 | 553 |
| 7 | 90:10 | 90:10 | 207 | 307 | 1.5 | 1713 | −15.1 | 425 | 478 |

As seen from Table 1, samples 2 to 6 with the "Sintered Body Area Ratio/Core-Shell:Homogeneous" in the range of 91:9 to 99:1 achieved higher-quality results for both of the accelerated life and BDV, as compared with the samples 1 and 7 which deviated from this range.

Furthermore, samples 2 to 6 described above also satisfied X7R characteristics for the "temperature characteristics".

EXPERIMENTAL EXAMPLE 2

Laminated ceramic capacitors as samples were manufactured under the same conditions as in Experimental Example 1, and evaluated in the same way as in Experimental Example 1, except that:

(1) the mean particle size of prepared $BaTiO_3$ powder through SEM observation and the mean particle size of prepared $(Ba_{0.96}Dy_{0.04})(Ti_{0.97}Mg_{0.03})O_3$ powder through SEM observation are shown respectively in the columns "$BaTiO_3$ Powder/Mean Particle Size" and "$(Ba_{0.96}Dy_{0.04})(Ti_{0.97}Mg_{0.03})O_3$ Powder/Mean Particle Size"; and (2) the mix ratio of $(Ba_{0.94}Dy_{0.06})(Ti_{0.97}Mg_{0.03})O_3$ to $BaTiO_3$ (corresponding to "$(Ba_{0.94}Dy_{0.06})(Ti_{0.97}Mg_{0.03})O_3$ Powder/Mix Ratio" of Table 1) was fixed at 95:5. The evaluation results are shown in Table 2.

TABLE 2

| Sample Number | BaTiO$_3$ Powder Mean Particle Size (nm) | (Ba$_{0.94}$Dy$_{0.06}$)(Ti$_{0.97}$Mg$_{0.03}$)O$_3$ Powder Mean Particle Size (nm) | Sintered Body Area Ratio Core-Shell: Homogeneous | R1 (nm) | R1 (nm) | R2/R1 | Dielectric Constant | Temperature Characteristics (%) | Accelerated Life (hours) | BDV (V) |
|---|---|---|---|---|---|---|---|---|---|---|
| 11 | 214 | 666 | 95:5 | 214 | 684 | 3.2 | 1832 | −13.7 | 452 | 504 |
| 12 | 206 | 588 | 95:5 | 206 | 608 | 3.0 | 1814 | −13.6 | 531 | 551 |
| 13 | 200 | 454 | 95:5 | 200 | 446 | 2.2 | 1840 | −14.0 | 649 | 571 |
| 14 | 215 | 238 | 95:5 | 215 | 220 | 1.0 | 1820 | −14.3 | 673 | 604 |
| 15 | 209 | 166 | 95:5 | 209 | 167 | 0.8 | 1850 | −14.6 | 574 | 563 |
| 16 | 207 | 125 | 95:5 | 207 | 122 | 0.6 | 1902 | −148 | 564 | 511 |

As can be seen when the samples 12 to 15 are compared with the samples 11 and 16 in Table 2, it has been confirmed that the accelerated life and BDV can be kept at high levels when the ratio R2/R1 of the mean grain size R2 of the crystalline grains with the homogeneous structure to the mean grain size R1 of the crystalline grains with the core-shell structure is made 0.8 or more and 3 or less.

What is claimed is:

1. A dielectric ceramic having a composition of BaTiO$_3$ as the main component and R and Mg as accessory components, where R is at least one member selected from La, Ce, Pr, Nd, Sm, Eu, Gd, Tb, Dy, Ho, Er, Tm, Yb, and Lu, the dielectric ceramic comprising crystalline grains which have a core-shell structure in which no accessory component is present as a solid solution in a central portion of the crystalline grain and the accessory components are present as a solid solution in a surface layer of the crystalline grain, and crystalline grains which have a homogeneous structure in which the accessory components are homogeneously present throughout the crystalline grain, wherein the core-shell crystalline grains and the homogeneous crystalline grains are present at an area ratio in the range of 91:9 to 99:1, and wherein the ratio R2/R1 is 0.8 or more and 3 or less where R2 is the mean grain size of the homogeneous crystalline grains and R1 is the mean grain size of the core-shell crystalline grains.

2. The dielectric ceramic according to claim 1, wherein the core-shell crystalline grains to homogeneous crystalline grains area ratio is the range of 93:7 to 97:3.

3. The dielectric ceramic according to claim 2, wherein R is Dy.

4. The dielectric ceramic according to claim 3 which has been sintered.

5. A laminated ceramic capacitor comprising:
a capacitor main body comprising a plurality of laminated dielectric ceramic layers, and a plurality of internal electrodes disposed at different interfaces between adjacent dielectric ceramic layers; and
a pair of external electrodes disposed at positions different from each other on an outer surface of the capacitor main body, and electrically connected to different ones of the internal electrodes,
wherein the dielectric ceramic layers comprise the dielectric ceramic according to claim 4.

6. A laminated ceramic capacitor comprising:
a capacitor main body comprising a plurality of laminated dielectric ceramic layers, and a plurality of internal electrodes disposed at different interfaces between adjacent dielectric ceramic layers; and
a pair of external electrodes disposed at positions different from each other on an outer surface of the capacitor main body, and electrically connected to different ones of the internal electrodes,
wherein the dielectric ceramic layers comprise the dielectric ceramic according to claim 3.

7. The dielectric ceramic according to claim 2 which has been sintered.

8. A laminated ceramic capacitor comprising:
a capacitor main body comprising a plurality of laminated dielectric ceramic layers, and a plurality of internal electrodes disposed at different interfaces between adjacent dielectric ceramic layers; and
a pair of external electrodes disposed at positions different from each other on an outer surface of the capacitor main body, and electrically connected to different ones of the internal electrodes,
wherein the dielectric ceramic layers comprise the dielectric ceramic according to claim 7.

9. A laminated ceramic capacitor comprising:
a capacitor main body comprising a plurality of laminated dielectric ceramic layers, and a plurality of internal electrodes disposed at different interfaces between adjacent dielectric ceramic layers; and
a pair of external electrodes disposed at positions different from each other on an outer surface of the capacitor main body, and electrically connected to different ones of the internal electrodes,
wherein the dielectric ceramic layers comprise the dielectric ceramic according to claim 2.

10. The dielectric ceramic according to claim 1, wherein the ratio R2/R1 is 1 to 2.2.

11. The dielectric ceramic according to claim 10 which has been sintered.

12. A laminated ceramic capacitor comprising:
a capacitor main body comprising a plurality of laminated dielectric ceramic layers, and a plurality of internal electrodes disposed at different interfaces between adjacent dielectric ceramic layers; and
a pair of external electrodes disposed at positions different from each other on an outer surface of the capacitor main body, and electrically connected to different ones of the internal electrodes,
wherein the dielectric ceramic layers comprise the dielectric ceramic according to claim 11.

13. A laminated ceramic capacitor comprising:
a capacitor main body comprising a plurality of laminated dielectric ceramic layers, and a plurality of internal electrodes disposed at different interfaces between adjacent dielectric ceramic layers; and
a pair of external electrodes disposed at positions different from each other on an outer surface of the capacitor main body, and electrically connected to different ones of the internal electrodes,
wherein the dielectric ceramic layers comprise the dielectric ceramic according to claim 10.

14. The dielectric ceramic according to claim 1, wherein R is Dy.

15. The dielectric ceramic according to claim 14 which has been sintered.

16. A laminated ceramic capacitor comprising:

a capacitor main body comprising a plurality of laminated dielectric ceramic layers, and a plurality of internal electrodes disposed at different interfaces between adjacent dielectric ceramic layers; and a pair of external electrodes disposed at positions different from each other on an outer surface of the capacitor main body, and electrically connected to different ones of the internal electrodes, wherein the dielectric ceramic layers comprise the dielectric ceramic according to claim 15.

17. A laminated ceramic capacitor comprising:

a capacitor main body comprising a plurality of laminated dielectric ceramic layers, and a plurality of internal electrodes disposed at different interfaces between adjacent dielectric ceramic layers; and a pair of external electrodes disposed at positions different from each other on an outer surface of the capacitor main body, and electrically connected to different ones of the internal electrodes, wherein the dielectric ceramic layers comprise the dielectric ceramic according to claim 14.

18. The dielectric ceramic according to claim 1 which has been sintered.

19. A laminated ceramic capacitor comprising:

a capacitor main body comprising a plurality of laminated dielectric ceramic layers, and a plurality of internal electrodes disposed at different interfaces between adjacent dielectric ceramic layers; and a pair of external electrodes disposed at positions different from each other on an outer surface of the capacitor main body, and electrically connected to different ones of the internal electrodes, wherein the dielectric ceramic layers comprise the dielectric ceramic according to claim 18.

20. A laminated ceramic capacitor comprising:

a capacitor main body comprising a plurality of laminated dielectric ceramic layers, and a plurality of internal electrodes disposed at different interfaces between adjacent dielectric ceramic layers; and a pair of external electrodes disposed at positions different from each other on an outer surface of the capacitor main body, and electrically connected to different ones of the internal electrodes, wherein the dielectric ceramic layers comprise the dielectric ceramic according to claim 1.

* * * * *